Patented Aug. 30, 1938

2,128,565

UNITED STATES PATENT OFFICE 2,128,565

PROCESS OF INCREASING THE VISCOSITY OF CREAM

Anna L. Steckelberg, Plymouth, Nebr., and Jean Broadhurst, New York, N. Y.

No Drawing. Application October 23, 1935, Serial No. 46,340. Renewed January 17, 1938

18 Claims. (Cl. 99—60)

Our present invention relates to a process for treating cream, whereby its texture or viscosity, including whipping quality, is substantially improved without changing palatability, digestibility and nutritive qualities. Also, the process supplemented by the customary refrigeration given to cream after collection, pasteurization and during storage, both in transit and in stores and homes, assures a low bacterial count and the continuation of these qualities over long periods. The process thus in addition to greatly improving the texture or viscosity of the treated cream also greatly prolongs its useful life as sweet cream, and makes it perfectly usable in the home over long intervals.

The present application is a continuation in part of our previously filed United States application Serial Number 625,196, filed July 27, 1932.

The process comprises broadly two phases operating in combination, one concerned with adding a small amount of acid to the cream and another phase concerned with the application of heat.

The addition of acid is accomplished by adding an acid, preferably a dilute solution of lactic acid, to the cream to be treated. In lieu of lactic acid, other organic acids might be used, such as tartaric acid, acetic acid, malic acid, gluconic acid, and even an inorganic acid, such as hydrochloric acid, but it is preferable from various points of view to use lactic acid because it is normal to milk, the other acids not being characteristic of cream or being present only in advanced stages of bacterial activity.

In general it may be said that equal volumes of normal solutions of lactic and the other acids, or rather the actual weights of the different acids therein, may be used in our process to accomplish substantially the same viscosity-increases.

The amount of acid added is so small, only a fraction of a gram of lactic acid to a quart of cream, that it is desirable to dilute the acid to insure an even mixture with the cream being treated. High fat content cream is preferably used as the diluent, though we could use a portion of the cream being treated or even pure water.

The acid, diluted as already mentioned, is added slowly to the batch of cream to be treated, stirring or agitating the cream to insure an even mixing of the acid in the cream, to make sure of the full benefits of the added acid and also to avoid the possible curdling of any small areas of over-acidified cream.

The dilute lactic acid may be added to the batch after the batch has been warmed up or heated, although the time of addition is not essential provided the heat and acid are present at the same time. In commercial practice, it will be preferable to mix the acid with the cream while chilled and standing in the receiving tanks or cans, thus insuring by a somewhat longer period of exposure a more thorough distribution of the acid before the heating phase of our process. In fact, any mixing procedure may be adopted, either before or during heating, or while the batch is still hot, that will serve to incorporate the acid with the batch without curdling it.

The acid addition must not be great enough to produce a sour taste or to cause curdling. Most creams taste sour at acidities of 0.3% and curdle at approximately 0.4% titratable acidity using phenolphthalein as an indicator. However, it is not necessary to even approach these undesirable states of sourness or curdling for the full benefits of our process. Our acid addition does not produce any accompanying discernible change in texture or taste until our heating step is applied, whereupon there is still no change in taste but the texture or viscosity is markedly affected.

The acid addition necessary to produce the desired viscosity change varies with the fat content of the cream, high fat creams not needing as much added acid as do low fat creams. Expressing it in other terms, the higher the milk content, the higher the acid addition necessary. Usual additions of lactic acid in treating various creams by our process are the following:—

|  | Grams lactic acid per liter of cream |
|---|---|
| 19–20% cream | 0.4 –0.6 |
| 27–30% cream | 0.25–0.5 |
| 38–40% cream | 0.2 –0.4 |

Surprising as it may seem, we have found the degree of the original or natural acidity before treatment of sweet cream is immaterial; and that to get marked increase of viscosity requires adding more acid and heating in accordance with our process, no determination of the acid already present being necessary.

Thus, we have treated creams by our process successfully at original or natural acidities ranging from pH 6.43 to pH 5.75; and, as measured by titration using phenolphthalein, from acidities of 0.09 to 0.185 percent. The applicability of our process throughout such a wide range of acidity before treatment is very important, as cream may vary greatly in age and acidity when it reaches the collecting and treatment plants.

Bacteria and other micro-organisms with their unpredictable enzymes doubtless affect the acid condition of the creams to be treated; but these factors may be ignored in treating sweet creams because in practice the process is effective with all types of cream:—single cow, single herd, mixed herd, fresh and several days old, raw and previously pasteurized, hand milked and machine milked.

The following table shows the improved viscosity imparted by our process to various creams, despite their widely varying natural acidities as specified in the first column of the table. The acidities were determined by phenolphthalein titration in the usual manner and are expressed in the customary weight-percentage figures. The figures for viscosity represent the number of seconds it took 1 c. c. of the cream at 16° C. to drip from a standard small orifice. The illustrative figures follow with creams of varying fat contents (19% to 40%) as indicated by the great variation in the viscosity before treatment. The resulting viscosities are not always maximum viscosities which would result by our treatment but were viscosities obtained with varying acid additions we happened to use.

| Acidity before treatment | Viscosity before treatment | Viscosity after treatment |
|---|---|---|
| Percent | | |
| 0.09 | 80 | 600 |
| 0.10 | 90 | 250 |
| 0.10 | 70 | 480 |
| 0.10 | 40 | 500 |
| 0.105 | 120 | 440 |
| 0.105 | 160 | 520 |
| 0.11 | 80 | 800 |
| 0.11 | 75 | 350 |
| 0.117 | 80 | 285 |
| 0.12 | 60 | 600 |
| 0.123 | 60 | 400 |
| 0.13 | 40 | 480 |
| 0.13 | 60 | 420 |
| 0.135 | 50 | 840 |
| 0.135 | 60 | 700 |
| 0.135 | 65 | 690 |
| 0.14 | 90 | 340 |
| 0.14 | 80 | 185 |
| 0.15 | 35 | 120 |
| 0.155 | 80 | 400 |
| 0.17 | 45 | 720 |
| 0.175 | 70 | 480 |
| 0.175 | 100 | 1050 |
| 0.18 | 90 | 340 |

The mere addition of acid to cream in the absence of the heat phase of our process does not improve viscosity. Our work confirms Babcock's findings on this point. See Bull. No. 1075, dated July 13, 1922, U. S. Dept. of Agric., where Babcock states his finding that increasing the acidity of cream does not affect the whipping quality until the acidity content exceeds 0.3 percent at which time the cream acquires a sour taste. This figure 0.3% is much higher than the preferred acidities used in our process, for we have never found it helpful to use acidities of over 0.19% and our usual final acidity is below 0.17%, even for 19 to 20% cream.

Further we have found that not every way of acidifying the cream will produce the effects of our process even when the process is otherwise completely carried out. Thus the heat phase applied to cream which has developed its acidity in a natural way gives no substantial improvement in viscosity. Again the addition of naturally soured cream as the source of acid accompanied by our heating step is ineffectual. The Thompson British Patent No. 27,854 of 1904 discloses treatment of 20% cream by adding sour cream to it followed by heating, the latter being for killing the "acid bacteria" and not for our purpose. We have practiced the Thompson process but it is evidently radically different from our process because it fails to produce our marked viscosity increase, this in spite of the fact that we have practiced the Thompson process with additions of sour creams having a wide range of acidities from nearly sweet cream up to creams so sour that they added in one case 0.40 gram lactic acid, in another 0.49 gram lactic acid and in a third case 0.64 gram lactic acid to each liter of cream under treatment. In these last named tests, the original viscosity of the 20% cream under treatment was 42 seconds and it whipped at 400 strokes. After the Thompson treatment using even the above very sour creams as the source of lactic acid, the viscosity of the treated creams was unchanged, remaining at 40 to 45 seconds per c. c. and no real advantage showed on whipping: one whipping at 475 strokes, one at 350 and the third at 525 strokes. Any improvement in whipping by the Thompson method could doubtless be accounted for by the fat in the added cream, up to 10%. In contrast, we may cite the result obtained by our process in which no fat is added, for with the same 20% cream, by adding 0.5 gram lactic acid per liter and heating, we obtained a drop viscosity of 440 seconds and a whipping quality of only 275 strokes.

It seems therefore, that the acid to be effective in our process should be fresh acid, by which is meant that it should not have been in contact with milk or cream for so long a time as to become ineffective in our process to produce marked viscosity increase.

This accords with our experience that to get maximum viscosity-increases by our process, the acidified cream should be heat-treated, either right away or within a reasonably short time, say in about 2–4 hours, especially if it be a low fat cream (19–20%). In tests made on certain high fat cream (38%) the acid remained fresh and effective in spite of delaying the application of the heat treatments until 18 to 20 hours after acidifying, the cream being kept cool (8–10° C.) to prevent bacterial multiplication which would introduce unpredictable factors.

The heat and acid periods may coincide in the practice of our process, especially where automatic devices make possible the even distribution of the acid. In practice however, it will usually be more convenient to add the acid shortly before the heating step.

Cream treated by our process shows on cooling a prompt and marked change in thickness or viscosity, the maximum effect of which is usually obtained by chilling the cream for 2 to 3 hours after the treatment. This is commercially a distinct advantage. Ordinary pasteurized cream does not regain its full viscosity until a day or so after pasteurizing.

The heat phase of the process may vary considerably both as to procedure and as to the temperatures employed. The temperatures may be either above or below the boiling point of milk which is ordinarily given at 101° C. at atmospheric pressure. For instance, one effective heat treatment after adding to the cream the required amount of acid consists in heating the acidified cream to a suitable temperature range above the boiling point. Such temperatures may be a peak temperature, cooling beginning as soon as the designated temperature is reached, or it may be maintained for a short period, for example, up to 10 to 25 minutes, after which the cream is allowed to cool or is artificially cooled, and is then kept, until used, under the usual refrigerating conditions observed in the dairy industry, usually at about 10° C.

This heat treatment where the temperature employed is above the boiling point may be carried out in various ways. Thus the product may be treated in closed jars, cans, tanks or other suitable receptacles and these may be hermetically sealed or may have merely a clamped-on closure with a rubber gasket between the lid and the mouth of the receptacle. These receptacles containing the cream will then be put in pressure boiler, sterilizer or autoclave containing water which is then heated and brought up to the required temperature above the boiling point, and kept at that temperature for a short period, not exceeding 10 to 20 minutes, preferably.

The temperature may be taken from a thermometer within the boiler or heater and read directly from the outside or recorded on diagrams to show continuous temperature changes or conditions. At 110° C. to 118° C. the steam pressure in the boiler will be about 6 to 12 pounds per square inch. This instance is cited merely to show that the temperature may be judged by using a pressure gauge instead of a thermometer though the actual temperature will vary several degrees depending upon whether or not air is left enclosed in the steam and heating chambers. Following the heating period, the heat is turned off, and the temperature pressure allowed to drop to 100° C. and zero pressure.

The heating period should be a brief one to avoid permanent taste and color changes in the cream. It is these two conditions which limit the upper temperature (118° C. to 121° C.) or pressure limits as above stated, as well as the time period. While they are less noticeable in cream than in milk heated to the same temperatures, the chances of such changes should be minimized by using the lower ranges of pressure and temperatures and using them for short periods. In many cases, especially with the higher fat content creams, such low temperatures as 101° C. and pressures of one-half pound for 5 minutes are sufficient to secure favorable viscosity changes in acid-treated cream.

Cream so treated is cooled as promptly as possible to further avoid any deleterious effects due to overheating and to prevent the activity of any surviving micro-organisms. While it is possible to secure the desired viscosity changes when cream cools very slowly, through 2 or 3 hours, to room temperature before being definitely chilled, there is no gain in such delay, and slightly better effects or higher viscosities are obtained with prompt chilling, as for example, to 5° to 8° C. in 10 to 20 minutes after completing the heating. The method of cooling, water baths, brine jacket pipes, etc., will vary with the commercial conditions employed in various dairies.

It may be stated in connection with our process that increasing the quantity of the acid within limits tends to give still greater viscosity increases. Likewise, increasing the temperature and length of the heat treatment, other things being equal, also increases the viscosity.

The higher the percentage of fat in the treated cream, the lower may be the temperature used and also the smaller the addition of acid to produce substantial viscosity increases. Thus, batches of 40% cream and other high fat creams may be treated by our process with resulting marked increases of viscosity at temperatures as low as 90-91° C. and with acid additions as low as 0.08 to 0.2 gm. per liter of cream. On the other hand, some lots of lower fat creams, e. g., 19% and 20% cream, have been treated where temperatures of 97° to 100° C. and acid additions of 0.5 to 0.6 gm. per liter are necessary in order to obtain marked viscosity increase.

In our experience the viscosities may be, on the whole, as favorably increased by using temperatures below 100° C. as by temperatures above 100° C. if we follow the acid addition quite promptly by the heat treatment. After 6 or more hours the minimum acid additions do not yield as consistent and rarely as good results as if the cream is heated as promptly as routine procedure in the plant and thorough mixing permit, that is, within approximately two to four hours after adding the acid or sooner.

The advantage of keeping the temperatures of treatment below the boiling point is not only that the color and taste are less likely to be affected but that it permits the process to be carried out under ordinary atmospheric-pressure conditions without using autoclave or other pressure apparatus; and thereby makes the process still more practicable commercially. Thus the cream may be treated in apparatus of the usual pasteurizing type, while flowing through a pipe and the heat may be supplied by a surrounding steam or hot-water jacket to heat the cream to the desired temperature for the desired duration as it flows through the pipe. Thereafter the product may be cooled more or less quickly in another part of the piping surrounded with refrigerated brine or other suitable heat abstracting medium.

However, it will be understood that our process is not limited to any particular method or form of heat treatment or apparatus. Thus a heat treatment effective in our process consists simply in subjecting the acid-treated cream to the ordinary pasteurizing treatment, both as to pasteurizing temperature, 62.5–65° C., and length of treatment 20–30 minutes, and then at the end of the pasteurizing period, raising the temperature of the batch to a peak below the boiling point, and then immediately or after a minute or so of heating at said peak, cooling the cream. The pasteurizing may run from 20 to 30 minutes followed by a 6 to 10 minute period, during which time the temperature is gradually raised to the selected peak below the boiling point, when it may be immediately cooled or held for a minute or so before cooling. Of course the peak temperature may be made to go above the boiling point, but this is not preferred and is not necessary except to obtain very high viscosities, and as already indicated is not so commercially practicable since it requires the use of pressure apparatus.

Our process is equally applicable to cream previously pasteurized. Cream which has been pasteurized and stored at the usual storage temperatures may be acid-treated and then heated to the desired temperature to improve viscosity. Pasteurized cream has been successfully so treated 2 to 3 days after house delivery.

Also the whipping quality of cream is definitely improved by our process, the whipped state being obtained with fewer whips or beats and the resulting whipped cream being firmer and retaining its whipped form more completely and for longer periods. Quite typical are such differences as 620 beats required to whip a given cream before treatment and only 400 required to whip the same cream after our treatment; or 500 before to 325 after; or 650 before to 375 after.

The whipped cream of our process is smoother after standing and a smaller percentage of drainage-water is found in the bottom of the container:—10 to 16% in 19 to 20% cream after 24 hours as compared with 21% to 26% of drainage water in whipped control samples of same cream. The combined acid and heat treatment of cream just described, whether used alone or in conjunction with pasteurization, further improves the quality of the cream by markedly reducing its bacterial content, such creams often being sterile after being subjected to our process.

*Bacterial effects*

| Original counts | Counts per cc. | | |
|---|---|---|---|
| | After pasteurization | After our acid-heat process | |
| | | Temperature | Count |
| | | ° C. | |
| 1,200,000 | 35,000 | 100 | 0 |
| 120,000 | 60,000 | 105–110 | 20 |
| 3,000 | 1,800 | 98 | 50 |
| 2,500 | 500 | 98 | 0 |
| 6,000 | 260 | 93 | 0 |

The following outlines the procedures within our invention which we prefer to adopt for treating creams of different grades of richness to improve their viscosity. The examples are to be taken as illustrative of the invention and not in a limiting sense.

Example No. 1 relates to 19–20% cream. This grade of cream usually needs acid additions (in round numbers) of 0.4 to 0.6 gm. lactic acid per liter, though occasionally 0.3 gm. will suffice. The acid-treated cream must be thoroughly (evenly) mixed, when it must be heated to at least 97° C., preferably to 98–99° C. The heat may be reduced immediately, though more consistent results are obtained if it is maintained for a short period—one full minute or longer—and it may be maintained even for 10 to 20 minutes. The cream may be quickly cooled by brine, etc. used as in the cooling step following ordinary pasteurizing. Increased viscosity is evident to the eye when the treated cream has become thoroughly chilled (8°–10° C.), although 2 or more hours of refrigeration gives somewhat higher and more consistent viscosity increases. Slow cooling means a delay in reaching high viscosities; but with it as high a viscosity may be reached in 18 to 24 hours as that shown immediately after rapid cooling (20 to 40 min.).

Example No. 2 relates to 27–30% cream. Desirable acid additions for 27–30% cream will be usually 0.25 to 0.5 gm. lactic acid per liter of cream. The temperature level may be lowered to 95° C., which again may be a peak temperature, though more consistent results are obtained if it it maintained for at least a full minute. There is, however, no need to limit the temperature to 95° C. and the higher temperatures used for lower fat creams may be used with good results. Typical results are given below:

27–30% cream: Temperature 95° C.–96° C. used either as peak temperatures or maintained 1–3 minutes. Original viscosities 55–80 seconds were raised to 255, 280, 440, 480, 520, 520, 600 in 7 tests respectively.

Example No. 3 relates to 38 to 40% cream. In the treatment of this rich cream, the acid additions and the heat levels may be still further reduced. The acid additions may be from 0.2 to 0.4 gm. lactic acid per liter. The temperature level may be as low as 90° C. for 40% cream, though 93° C. is more uniformly successful for both 38 and 40% cream. Here, again, no disadvantage is found in using the heat and time periods of lower fat creams as previously described.

Typical results with 38–40% creams are given below: 38–40% cream, temperature 93–94° C. used either as peak temperatures or maintained 1–3 minutes. Original viscosities 75–120 seconds were raised to: 310, 360, 375, 440, 520, 700, 800 in 7 different tests.

While preferred methods of carrying out this invention have been described for purposes of illustration with considerable detail, it is to be understood that its scope is not limited to details of the disclosure except as required by the appended claims.

What we claim is:

1. The process for increasing the viscosity of 19 to 20% cream which comprises adding approximately 0.4 to 0.6 gram of lactic acid per liter to the cream, and heating the cream to approximately 97° C. to 100° C. to increase the viscosity of the cream.

2. The process for increasing the viscosity of 27 to 30% cream which comprises adding approximately 0.25 to 0.5 gram of lactic acid per liter to the cream and heating the acid-treated cream to approximately 95° C. to 100° C. to increase the viscosity of the cream.

3. The process for increasing the viscosity of 38–40% cream which comprises adding approximately 0.2 to 0.4 gram of lactic acid per liter to the cream and heating the acid-treated cream to approximately 90° C. to 100° C. to increase the viscosity of the cream.

4. The process for increasing the viscosity of cream which comprises adding an acid to the cream substantially less than that which would impart an acid taste to the cream, and heating the acid-treated cream to at least approximately 90° C. to produce a viscosity increase in the cream.

5. The process for increasing the viscosity of cream which comprises adding an acid to the cream substantially less than that which would impart an acid taste to the cream and heating the acid-treated cream to a temperature between approximately 90° C. and below the boiling point, and cooling the cream to produce a cream having a marked viscosity increase.

6. The process for increasing the viscosity of cream which comprises adding an amount of lactic acid thereto from approximately 0.2 gram per liter of the cream up to an amount substantially below that which would impart an acid taste to the cream, and heating the acid-treated cream to a temperature between approximately 90° C. and below the boiling point to increase the viscosity of the cream.

7. The process for increasing the viscosity of cream which comprises adding an amount of lactic acid thereto from approximately 0.2 gram per liter of the cream up to an amount substantially below that which would impart an acid taste to the cream, and heating the acid-treated cream to a temperature approximately between 90° C. and 120° C. without boiling the cream and employing superatmospheric pressure at and above the normal boiling point of the cream to prevent boiling thereof during treatment to increase the viscosity of the cream.

8. The process for increasing the viscosity of cream which comprises adding an acid to a cream substantially less than that which would impart an acid taste to the cream, the cream having a fat content of about 19% to 40%, heating the acid-treated cream after the addition of the acid to between approximately 90° C. and 120° C. without boiling the cream and employing superatmospheric pressure at and above the normal boiling point of the cream to prevent boiling thereof during treatment, and then chilling the treated cream to produce a cream having an increased viscosity.

9. The process for increasing the viscosity of cream which comprises adding an acid to a cream substantially less than that which would impart an acid taste to the cream, the cream having a fat content of about 19% to 40%, heating the acid-treated cream soon after the addition of the acid to between approximately 90° C. and 120° C. without boiling the cream and employing superatmospheric pressure at and above the normal boiling point of the cream to prevent boiling thereof during treatment and then chilling the treated cream to produce a cream having an increased viscosity.

10. The process for increasing the viscosity of cream which comprises adding an acid to a cream substantially less than that which would impart an acid taste to the cream, the cream having a fat content of about 19% to 40%, heating the acid-treated cream within about 20 hours after the addition of the acid to between approximately 90° C. and 120° C. without boiling the cream and employing superatmospheric pressure at and above the normal boiling point of the cream to prevent boiling thereof during treatment, and then chilling the treated cream to obtain a cream having an increased viscosity.

11. The steps in the process of treating cream to increase the viscosity of the cream which comprise heating a 19% to 40% cream, to which has been added a solution of lactic acid in an amount substantially less than that which would impart an acid taste to the cream, to approximately 90° C.–120° C. without boiling the cream and employing superatmospheric pressure at and above the normal boiling point of the cream to prevent boiling thereof during treatment and then cooling such treated cream to produce a cream having an increased viscosity.

12. In the process of heating and treating cream to increase the viscosity of the cream, the steps which comprise adding a solution of an acid to the cream in an amount substantially less than that which would impart an acid taste to the cream, heating the acid-treated cream to approximately 90° C. and then cooling the cream to produce a cream having an increased viscosity.

13. The process of heating and treating cream to increase the viscosity of the cream which comprises making a solution of an acid, adding such solution to cream in an amount substantially less than that which would impart an acid taste to the cream, heating the acid-treated cream to approximately 90° C., and then cooling the treated cream to produce a cream having an increased viscosity.

14. The process of heating and treating cream to increase the viscosity of the cream which comprises adding an acid to a small amount of cream, adding such cream solution to the cream to be treated in an amount substantially less than that which would impart an acid taste to the cream to be treated, heating the acid-treated cream to approximately 90° C., and then cooling the treated cream to produce a cream having an increased viscosity.

15. The process for increasing the viscosity of cream, which comprises adding an acid to the cream substantially less than that which would impart an acid taste to the cream, and heating the acid-treated cream to less than 100° C. to produce a viscosity increase in the cream.

16. The process for increasing the viscosity of cream, which comprises adding an acid to the cream substantially less than that which would impart an acid taste to the cream, and heating the acid-treated cream to less than 100° C., and cooling the cream to produce a cream having a marked viscosity increase.

17. The process for increasing the viscosity of cream, which comprises adding an amount of lactic acid thereto from approximately 0.2 gram per liter of cream up to an amount substantially below that which would impart an acid taste to the cream, and heating the acid-treated cream to a temperature below 100° C. to produce a viscosity increase in the cream.

18. In the process of heating and treating cream to increase the viscosity of the cream, the steps which comprise adding a solution of an acid to the cream in an amount substantially less than that which would impart an acid taste to the cream, heating the acid-treated cream to a temperature less than the boiling point and then cooling the cream to produce a cream having an increased viscosity.

ANNA L. STECKELBERG.
JEAN BROADHURST.